No. 889,360.　　　　　　　　　　　　　　　　　PATENTED JUNE 2, 1908.
H. W. FELLOWS.
GEAR CALCULATOR.
APPLICATION FILED OCT. 11, 1907.
2 SHEETS—SHEET 1.
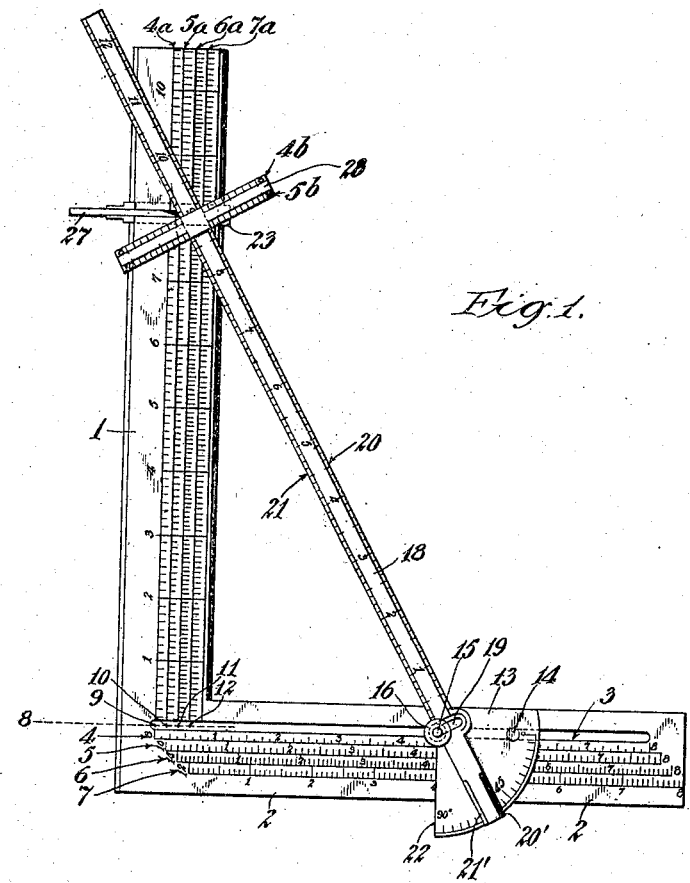
Fig. 1.
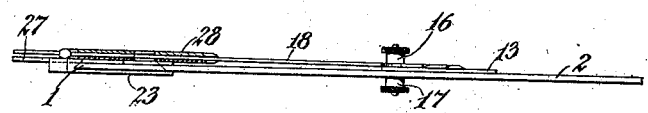
Fig. 2.
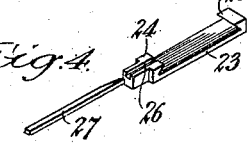
Fig. 3.
Fig. 4.
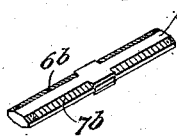
Fig. 5.
Witnesses:
Louis W. Gratz
Frank L. A. Graham
Inventor
Hugh W. Fellows
by Townsend & Hackley
his attys.

No. 889,360.
PATENTED JUNE 2, 1908.
H. W. FELLOWS.
GEAR CALCULATOR.
APPLICATION FILED OCT. 11, 1907.
2 SHEETS—SHEET 2.
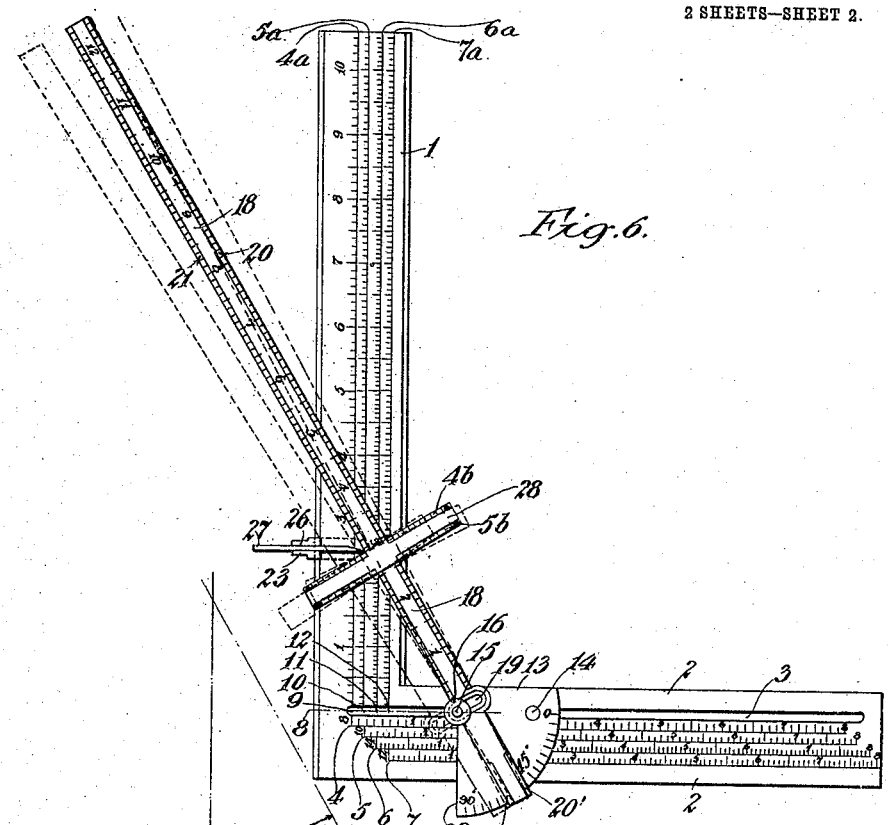
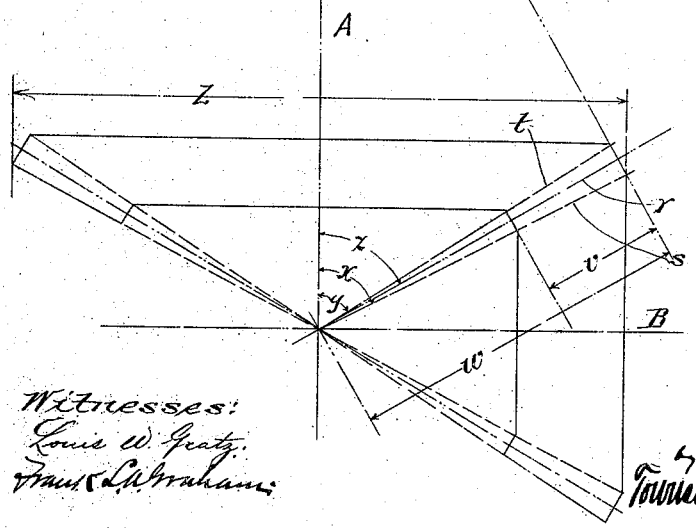
Witnesses:
Inventor:
Hugh W. Fellows.
by Townsend & Hackley
his Attys.

UNITED STATES PATENT OFFICE.

HUGH W. FELLOWS, OF CAHUENGA, CALIFORNIA.

GEAR-CALCULATOR.

No. 889,360.　　　　Specification of Letters Patent.　　Patented June 2, 1908.

Application filed October 11, 1907. Serial No. 397,027.

*To all whom it may concern:*

Be it known that I, HUGH W. FELLOWS, a citizen of the United States, residing at Cahuenga, county of Los Angeles, State of California, have invented a new and useful Gear-Calculator, of which the following is a specification.

This invention relates to an instrument designed for calculating the angles at which to turn the blanks for bevel gears; also to determine the diameter over all of the gear blanks, and for determining the angle and cutting depth for the tooth. Ordinarily, in constructing a set of bevel gears, the workman plats out the gears by a sketch or drawing and gets the necessary measurements by scaling the drawing or by mathematical calculation therefrom, and the object of the present invention is to provide an instrument whereby platting is dispensed with and the necessary calculations made by working them out on the instrument. The device is of a nature akin to the slide rule and is not a drafting instrument.

The accompanying drawings illustrate the invention and referring thereto:—Figure 1 is a plan view of the instrument. Fig. 2 is an end elevation of the same looking toward the short arm. Fig. 3 is a perspective of the slide bar. Fig. 4 is a perspective of the pointer. Fig. 5 is a perspective of the blade bar. Fig. 6 is a plan view showing the different settings of the instrument in calculating a set of gears respectively 5 and 3 inches diameter and of 10 pitch given as an example in the specification, to illustrate the operation. Fig. 7 is a plat or diagram of the two bevel gear blanks for the purpose of aiding in the explanation of the example given in the specification. It should be understood that this view is merely for the purpose of rendering the explanation of the operation of the instrument clearer than would otherwise be possible. In the actual use of the instrument such platting is entirely eliminated. The said plat also serves to identify the terms used in connection with the gear blanks and the angles thereof.

The instrument comprises a long arm 1 and a short arm 2, the edges of the long arm being preferably beveled as shown. The short arm 2 is provided with a slot 3 and the short arm is provided with four rows of graduations 4, 5, 6 and 7, each row of graduations being divided into inches, and the inches of row 4 being divided into eighths, the inches of row 5 being divided into tenths, the inches of row 6 being divided into fourteenths, and the inches of row 7 being divided into twelfths. The long arm 1 is also provided with four rows of graduations $4^a$, $5^a$, $6^a$ and $7^a$, each row being divided into inches and each inch of the respective rows being subdivided into eighths, tenths, fourteenths and twelfths respectively. The respective inch marks in graduations of rows $4^a$, $5^a$, $6^a$ and $7^a$ are all in register and the first inch of each of said rows starts from an imaginary line, indicated by dotted line 8 Fig. 1, which is parallel with and in the center of slot 3. The four rows of graduations on the short arm are not in register with each other, but, as shown, the graduations of row 4 commence from a point 9 in the center of slot 3 on imaginary line 8 which intersects with the line of the graduations $4^a$. The graduations of row 5 commence from a point opposite an imaginary point 10 in the center of slot 3 in line with row $5^a$; the graduations of row 6 commence from an imaginary point 11 in line with row $6^a$, and the graduations of row 7 commence from an imaginary point 12 in line with the row $7^a$. There are thus four imaginary points 9, 10, 11 and 12 along the center of slot 3 which respectively aline with rows $4^a$, $5^a$, $6^a$ and $7^a$.

Slidably arranged on the short arm 2 is an angle plate 13 which has a stud 14 projecting into the slot 3 for guiding it and which has a stud 15, hereinafter termed the center stud, which stud projects above and below the angle plate 13 and is threaded on each end to receive knurled thumb nuts 16 and 17. The nut 17 serves to clamp the angle plate 13 in the desired position on short arm 2, while the nut 16 serves to clamp a blade 18, the latter having a transverse slot 19 through which the upper part of the center stud 15 passes. The blade 18 is formed with parallel edges 20 and 21 and may be adjusted on the center stud 15 so that either edge 20 or edge 21 intersects the axis of center stud 15. In Fig. 1 the blade is shown adjusted with edge 21 intersecting the axis of center stud 15. Each edge of the blade 18 is graduated in inches which may be subdivided into eighths, sixteenths, thirty-seconds, etc., like an ordinary scale, and the graduations on each edge start from the center of slot 19. The angle plate 13 has a straight edge 22 which is always perpendicular to the short arm 2 and the edge 22 is arranged on a line which intersects the axis of center stud 15. The angle plate 13 is graduated in degrees for a quarter of a circle, the graduations commencing with 0° at the center of slot 3, the 90° division being exactly at the straight edge 22, the said degree graduations being formed on an arc concentric with the center stud 15, and each edge of the blade 18 is beveled at 20' and 21' to enable accurate reading of the angular position of the blade on the angle plate 13.

Slidably mounted on the long arm 1 is a slide bar 23, shown in detail in Fig. 3, having two undercut lugs 24 and 25 which engage the beveled edges of the arm 1, and the lug 24 having in its upper face a groove 26 with undercut walls, as shown, which slidably receive a pointer 27. This construction allows the slide bar 23 and pointer 27 to be shifted bodily longitudinally of the long arm 1 and permits the pointer 27 to be adjusted slidably in slide bar 23 transversely of the long arm 1.

A blade bar 28, shown in detail in Fig. 5, is slotted and slidably mounted on blade 18, the blade bar 28 having a total of four rows of graduations $4^b$, $5^b$, $6^b$ and $7^b$. Two rows $4^b$ and $5^b$ are provided on one face as shown in Fig. 1 and two rows $6^b$ and $7^b$ are provided on the other face as shown in Fig. 5. The blade bar 28 is reversible to bring either of its graduated faces uppermost and is also reversible end for end, and may be readily slipped off the end of the blade 18 when it is required to reverse it.

In using the instrument let it be assumed that the two gear blanks shown in Fig. 7 are to be calculated, pitch being 10, and gear A having a diameter of five inches and gear B having a diameter of three inches. The calculations to be determined by the instrument are: first, to determine the outside turning angle $x$ of the gear blank A; second, to determine the outside diameter $z$ of the gear blank A; third, to determine the cutting angle $y$ of the gear blank A; fourth, to determine the turning angle $u$ of the back cone of gear blank A; fifth, to determine the length of face $v$ of the tooth.

The dimensions of the gear blank being calculated, whether it be either the large or small gear, are determined on the long arm 1 of the instrument. The graduations on the short arm 2 of the instrument are for setting the center stud 15 in line with the center of the companion gear which is not being calculated. Thus, as gear A is the one to first be calculated, and as the pitch diameter of gear B is three inches, the angle plate 13 on arm 2 is adjusted so that its straight edge 22 is an inch and a half from the inner end of row $5$, that row being graduated for ten pitch. This setting of the instrument is shown in Fig. 6, and thus the center stud 15 is an inch and a half from the imaginary point 10. The angle plate 13 is then clamped in position by the lower thumb nut 17. In order to determine the outside turning angle $x$, it is first necessary to find the center angle $z$ of the gear. This is done by adjusting the edge 21 of blade 18 so that it intersects with center stud 15. The blade 18 is then swung around on center stud 15 until its edge 21 intersects, on the row $5^a$, with the graduation $2\frac{1}{2}$, as that is half the diameter of gear blank A. The edge 21 of blade 18 is now on a line corresponding with the line $r$ in Fig. 7, this position of the blade being shown in full lines in Fig. 6. The edge 21' of blade 18 now stands over a graduation on the angle plate 13 which denotes the center angle of the gear A, that is, the angle $z$, Fig. 7. The slide bar 28 is now adjusted on the blade 18 so that the graduations $5^b$, which are those for ten pitch, project over the long arm 1 of the instrument and lie nearest the inner end of the long arm 1 and the slide bar is then moved up until its edge, having graduations $5^b$, exactly intersects with edge 21 of blade 18 and with line of graduations $5^a$ on arm 1. The cross bar having thus been adjusted, the blade is then swung outward until the first graduation $5^b$, nearest edge 21, intersects with line of graduations $5^a$. This, it will be seen, will now bring the edge of blade bar 28 slightly beyond the "$2\frac{1}{2}$" mark on row $5^a$, and the blade bar must then be moved slightly inward on blade 18 until the said first inner graduation on the cross bar intersects with the line of row $5^a$ and with the "$2\frac{1}{2}$" mark thereon. The blade 18 now has a position corresponding to the line S, Fig. 7, and the edge 21' of blade 18 indicates on the angle plate 13 the degrees of the turning angle or angle $x$, Fig. 7; the blade 18 now standing in position indicated in right hand dotted lines, Fig. 6. After the outside turning angle $x$ has been calculated in this manner, with the instrument still set in this position, the slide bar 23 and pointer 27 are adjusted on the long arm so that the end of the pointer intersects at the point which has just been determined on arm 1, then the blade 18, together with blade bar 28, is swung back away from the pointer 27 which permits of a clear reading on arm 1 to show the distance of the pointer 27 from imaginary line 8, which distance is measured on row $5^a$, and this distance being one-half of the outside turning diameter of gear blank A may mentally be multiplied by two to give the total diameter. To determine the cutting angle $y$, the angle plate 13 is kept in its set position at the $1\frac{1}{2}$ mark on arm 2 but the blade 18 is shifted on center stud 15 so that edge 20 of blade 18 intersects with the center stud. The blade 18 is then adjusted so that its edge 20 again intersects with graduation $2\frac{1}{2}$ on row $5^a$ and then the blade 18 is swung inward, i. e., to the left carefully until the first graduation of row $5^b$ of the cross bar intersects with the line of row $5^a$. This, as before, brings the edge of cross bar 28 very slightly out of register with graduation 2½ on row 5ᵃ and the cross bar 28 should then be corrected slightly by shifting it on blade 18 so that the first mark 5ᵇ on the edge of cross bar 28 exactly coincides with graduation 2½ on row 5ᵃ. It should be noted that this correction, and the one heretofore mentioned, are minute, being merely the departure of the tangential edge of cross bar 28 from a circle of which the center stud is the center. This departure increases, obviously, with decreasing radii and decreases with increasing radii. The edge 20 of blade 18 now is on a line corresponding to the line $t$, Fig. 7, and its edge 20' indicates on the angle plate 13 the degree of the cutting angle $y$ of Fig. 7. Obviously, the angle $u$ at which to turn the back cone of gear blank A is readily determined from the center angle $z$, for the angle of the back cone is at 90° to the center angle. Thus, by subtracting the center angle $z$ from 90° will give the angle $u$ at which to turn the back cone.

The last calculation, of determining the length $v$ of the face of the tooth, is made by reading on the scale of blade 18 the distance of cross bar 28 from the center stud; then dividing this distance by three, the distance $v$ being in ordinary practice one third of the distance $w$. Should the distance $v$ be of different proportion, the same may be as readily calculated accordingly on the scale of blade 18. After the gear blank A has thus been calculated, the gear blank B is calculated in the same manner, but starting by setting angle plate 13 at graduation "2½" on arm 2 and making the settings "1718" on the long arm 1 for the gear blank B, the first of which would be to set the cross bar 28 and blade 18 to intersect with graduation "1½" on the long arm 1, thus giving center angle $z$, and so on.

What I claim is:—

1. A gear calculator comprising two arms forming a square, an angle plate having an intersection point slidable on one arm, linear graduations on each arm with pitch subdivisions, a blade with an edge extending across said intersection point and angularly across the graduations on the other arm, and an adjustable cross bar on the blade with pitch graduations.

2. A gear calculator comprising two arms forming a square, an angle plate having an intersection point slidable on one arm, a plurality of rows of linear graduations on each arm with pitch subdivisions, the rows of graduations on one arm commencing from a common line which intersects said intersection point, the rows of graduations on the other arm commencing respectively from the lines of the first specified rows, a blade with an edge extending across said intersection point and angularly across the first specified rows, and a cross bar on the blade provided with a plurality of sets of pitch graduations.

3. A gear calculator comprising two arms forming a square, an angle plate having an intersection point slidable on one arm, linear graduations on each arm with pitch subdivisions, a blade with an edge extending across said intersection point and angularly across the graduations on the other arm, and an adjustable cross bar on the blade with pitch graduations, the blade having linear graduations which commence from said intersection point.

4. A gear calculator comprising two arms forming a square, an angle plate having an intersection point slidable on one arm, linear graduations on each arm with pitch subdivisions, a blade adjustable on the angle plate to cause either of its edges to intersect said intersection point, the blade extending angularly across the other arm.

5. A gear calculator comprising two arms forming a square, an angle plate having an intersection point slidable on one arm, linear graduations on each arm with pitch subdivisions, a blade adjustable on the angle plate to cause either of its edges to intersect said intersection point, the blade extending angularly across the other arm, and a blade bar slidable and reversible on the blade and having a plurality of sets of pitch graduations on each face.

6. A gear calculator comprising two arms forming a square, an angle plate having an intersection point slidable on one arm, linear graduations on each arm with pitch subdivisions, a blade with an edge extending across said intersection point and angularly across the graduations on the other arm, an adjustable cross bar on the blade with pitch graduations, and a pointer adjustable laterally and longitudinally of the latter arm for indicating a determined point on the latter arm after the blade has been swung away for clear reading.

7. A gear calculator comprising two arms forming a square and one of which is slotted, an angle plate slidable on the slotted arm, a center stud on the angle plate riding in the slot, a clamp on the center stud for holding the angle plate in the position set, a blade having a transverse slot engaging with the center stud and permitting either edge of the blade to intersect the stud, and linear graduations on each arm with pitch subdivisions.

8. A gear calculator comprising two arms forming a square and one of which is slotted, an angle plate slidable on the slotted arm, a center stud on the angle plate riding in the slot, a clamp on the center stud for holding the angle plate in the position set, a blade having a transverse slot engaging with the center stud and permitting either edge of the blade to intersect the stud, linear graduations on each arm with pitch subdivisions, the blade having linear graduations commencing at the center of its transverse slot, and a blade bar slidable and reversible on the blade and having pitch graduations on both faces.

9. A gear calculator comprising two arms forming a square and one of which is slotted, an angle plate slidable on the slotted arm, a center stud on the angle plate riding in the slot, a clamp on the center stud for holding the angle plate in the position set, a blade having a transverse slot engaging with the center stud and permitting either edge of the blade to intersect the stud, linear graduations on each arm with pitch subdivisions, the blade having linear graduations commencing at the center of its transverse slot, a blade bar slidable and reversible on the blade and having pitch graduations on both faces, a slide bar adjustable longitudinally on the unslotted arm, and a pointer slidable on the cross bar extending over the latter arm.

10. A gear calculator comprising two arms forming a square and one of which is slotted, an angle plate slidable on the slotted arm, a center stud on the angle plate riding in the slot, a clamp on the center stud for holding the angle plate in the position set, a blade having a transverse slot engaging with the center stud and permitting either edge of the blade to intersect the stud, linear graduations on each arm with pitch subdivisions, the blade having linear graduations commencing at the center of its transverse slot, a blade bar slidable and reversible on the blade and having pitch graduations on both faces, a slide bar adjustable longitudinally on the unslotted arm, and a pointer slidable on the cross bar extending over the latter arm, the angle plate having a straight edge intersecting with the center stud and having degree graduations starting from a point over the center of the slot of the arm.

In testimony whereof, I have hereunto set my hand at Los Angeles, California, this 4th day of October, 1907

HUGH W. FELLOWS.

In presence of
GEORGE T. HACKLEY,
FRANK L. A. GRAHAM.